United States Patent
Ichiki et al.

(10) Patent No.: US 6,635,818 B2
(45) Date of Patent: Oct. 21, 2003

(54) WIRELESS POWER SUPPLY METHOD

(75) Inventors: Masaaki Ichiki, Tsukuba (JP); Koichi Ozaki, Tsukuba (JP); Yasushi Morikawa, Tsukuba (JP); Makoto Tanaka, Funabashi (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 126 days.

(21) Appl. No.: 09/935,719

(22) Filed: Aug. 24, 2001

(65) Prior Publication Data

US 2002/0027390 A1 Mar. 7, 2002

(30) Foreign Application Priority Data

Aug. 25, 2000 (JP) ........................................ 2000-255137

(51) Int. Cl.[7] ........................... H01L 41/08; H02J 17/00; B25J 19/00; G05B 24/02
(52) U.S. Cl. ....................... 136/291; 136/244; 136/293; 252/62.9 R; 252/62.9 PZ; 60/641.8; 310/303; 310/309; 310/311; 310/357; 310/358
(58) Field of Search ................................ 136/244, 291, 136/293; 252/62.9 R, 62.9 PZ; 60/641.8; 310/303, 309, 311, 357, 358

(56) References Cited

U.S. PATENT DOCUMENTS

| | | | | |
|---|---|---|---|---|
| 5,262,695 A | * | 11/1993 | Kuwano et al. | ............ 310/309 |
| 5,364,710 A | * | 11/1994 | Hikita | ............................. 429/9 |
| 5,428,961 A | * | 7/1995 | Sakakibara et al. | ............ 60/698 |
| 5,718,772 A | * | 2/1998 | Mori et al. | .................. 136/251 |
| 6,342,671 B1 | * | 1/2002 | Morikawa et al. | ........... 136/291 |

FOREIGN PATENT DOCUMENTS

| | | |
|---|---|---|
| JP | 4-241004 | 8/1992 |
| JP | 6-46539 | 2/1994 |
| WO | WO-98/50393 A1 * | 11/1998 |

OTHER PUBLICATIONS

Sakakibara et al, "Development of High–Voltage Photovoltaic Micro–Devices for an Energy Supply to Micromachines," Proceedings of the 5th International Symposium on Micro Machine and Human Science, pp. 71–76, Oct. 2–4, 1994.*

* cited by examiner

Primary Examiner—Alan Diamond
(74) Attorney, Agent, or Firm—Oblon, Spivak, McClelland, Maier & Neustadt, P.C.

(57) ABSTRACT

There is provided a wireless-type power supply method that is applied to the case where an object to which energy is to be transmitted is relatively small, such as a micromachine, and that allows high-voltage electrical energy to be transmitted without using a wire. In this method, the optical energy from an light source is converted into high-voltage electrical energy by means of an energy transducer formed of either a piezoelectric element or a photovoltaic element on the above-described object, and the high-voltage electrical energy is supplied to an actuator, whereby the construction of the receiving side of the energy transmission is simplified.

7 Claims, 3 Drawing Sheets

WIRELESS POWER SUPPLY METHOD

TECHNICAL FIELD OF THE INVENTION

The present invention relates to a method for wireless-type power supply by light from a distant location, and particularly, to a method for supplying a high-voltage power to an energy transducer such as a micromachine by irradiating the transducer with light.

DESCRIPTION OF THE RELATED ART

With recent progress in semiconductor manufacturing techniques and the like, research-and-development as well as proposals of prototypes of various micromachines (also named as "Micro Electro Mechanical Systems (MEMS) or Micro System Technology (MST) have been actively performed. Such systems have numerous functions and elements which are each integrated despite of the miniaturization of the size thereof, and find complicated and high-technique applications. Under such circumstances, in order to put micromachines to practical use, an energy supply method and effective power supply means for an actuating portion (actuator) constitute important elements for development.

In particular, when the dimension of a micromachine relative to that of a human operator becomes significantly small, conventional power supply methods using a wire become disadvantageous. Specifically, the dimension of the wire relative to that of the micromachine body becomes large, and thereby, not only the actuation for the micromachine causes a problem, but also the weight of peripheral portions and the friction occurring therebetween come to have an influence such as not to be neglected. In addition, there may be cases where directions of actions of the micromachine and the actuation range thereof are subjected to limitations, depending on the stiffness and the length of the wire.

One method for wireless-type power supply for a micromachine from a distant location, is light-based one. In this supply method, as an energy source, an electromagnetic wave such as light beam, a microwave, a sound wave, or the like is used, while as a receiver, a solar cell constituted of amorphous silicon, a silicon single crystal, or the like is used. Proposals have been made not only of a stationary-type and a battery-equipped self-traveling type micromachines, but also of a battery-unequipped type micromachine.

Wireless-type power supply systems comprise (1) solar light and a solar cell, (2) a microwave and a light-receiving element. On the other hand, as wire-type power supply methods, there have been numerous proposals of electrical methods, magnetic methods, and the like. FIGS. 5A and 5B are bock diagrams showing self-traveling (wireless type) power supply systems, and FIG. 5C is a block diagram showing a stationary (wire type) power supply system.

The control system also serves as an energy source, and the micromachine body is not equipped with an energy source. This relation can be seen from FIGS. 5A and 5B. The micromachine body has an energy receiving function, an energy conversion function, and an energy output function. However, these functions are performed by a single functional element, but not by a device as a system. As an actuator, an actuating mechanism such as an electrostatic actuator is used.

For example, Japanese Unexamined Patent application Publication No. 4-241004 proposes a concept that solar light and a solar cell are used as an energy source and a receiver, respectively, and Japanese Unexamined Patent application Publication No. 6-46539 discloses that light beams, a microwave, and a sound wave are used as an energy supply system, and that an amorphous solar cell as a photovoltaic element, a monolithic microwave IC, and a piezoelectric material are each employed as a receiver for energy source.

The electric power generation by a solar battery has already been put into actual use for objects which have a large size, such as a space structure. However, since the solar cell as a unit only generates about 1 volt or below, and incapable of generating a high voltage, it is necessary to integrate solar cells by connecting them in series. However, this causes a cost rise and incurs the complication of a device system to be produced.

Techniques of transmitting energy to an intra-pipe actuator by means of microwave transmission have already been devised. In these techniques, however, for the case of a microwave, the propagation mode suited to the energy transmission is limited to a predetermined mode (TEn), so that the frequency range is restricted corresponding to the intra-pipe dimensions. In addition, it has been pointed out that these techniques involve problems in that they cannot be applied to the spaces in open systems and pipes having locally different dimensions. A little more improvement would be required, in order to bring up these techniques to the practical application stage.

SUMMARY OF THE INVENTION

Accordingly, it is an object of the present invention to provide a wireless-type power supply method that is fundamentally applied to the case where an object to which energy is to be transmitted, is relatively small, and that allows high-voltage electrical energy to be transmitted without using a wire.

It is another specific object to provide a wireless-type power supply method effective in applying to the energy supply to portable electronic equipment, handy medical diagnosis systems, micromachines in open systems (including micromachines for use in the atmosphere, for use under water, and for use in a vacuum), environmental monitoring micromachines, in-vivo diagnosis monitoring machines, and intra-pipe maintenance machines.

It is still another object to provide a wireless-type power supply method which allows energy transmission from a remote location, and which has the overall system thereof simplified.

It is a further object to provide a wireless-type power supply method allows a high-voltage and low-current output to be achieved, which is suited to the actuating source for an electrostatic actuator.

In order to achieve the above-described objects, the present invention provides a method for wireless-type power supply, which is applied to the case where an object to which energy is to be transmitted, is relatively small. In this method, the optical energy from an light source is converted into high-voltage electrical energy by an energy transducer formed of either a piezoelectric element or a photovoltaic element on the above-described object, and the above-described high-voltage electrical energy is supplied to an actuator.

In a preferred embodiment of the present invention, a thermal excitation light source emitting visible infrared region laser light is used as a light source, and a piezoelectric element generating a thermal strain due to optical absorption is used as an energy transducer. More specifically, for the above-described piezoelectric element, a piezoelectric material constituted of lead zirconate titanate, barium titanate, or lead titanate is used.

In another preferred embodiment of the present invention, a photovoltaic light source laser or an ultraviolet irradiation lamp is used as a light source, and a photovoltaic element generating a photovoltaic effect is used as an energy transducer. More specifically, for the above-described photovoltaic element, a photovoltaic functional material constituted of lead lanthanum zirconate titanate, lithium niobate, or lithium tantalate is used.

In the above-described method in accordance with the present invention, since the electric output is characterized by a high voltage and low current, the electric output is suited to an actuating source for an electrostatic actuator which performs actuation using a high voltage and low current.

Also, by using the bimorph type as the energy transducer, it is possible to resonate the energy transducer to obtain a high-voltage output, and thereby to provide the control over the electrostatic actuator with superior responsivity.

The objects to which relatively small energies are to be transmitted, and which are suited to being subjected to the application of the above-described method in accordance with the present invention, specifically include portable electronic equipment, handy medical diagnosis systems, micromachines in open systems (including micromachines for use in the atmosphere, for use under water, and for use in a vacuum), environmental monitoring micromachines, in-vivo diagnosis monitoring machines, and intra-pipe maintenance machines.

The above-described method in accordance with the present invention is arranged to allow energy transmission from a remote location by using a piezoelectric element or a photovoltaic element, and thereby the overall system thereof is simplified by unifying the structure and function, resulting in a simplified manufacturing, Furthermore, the method in accordance with the present invention allows the application thereof in open systems, and enables the output to be increased by making use of the resonance between the thermo-electromotive force and the photovoltaic force due to light-receiving.

Moreover, since the present invention does not use a device as a solar battery but constitutes a receiver using a ceramic-based single element, a simple system can be realized.

BRIEF DESCRIPTION OF THE DRAWINGS

FIGS. 4A and 4B are diagrams showing an embodiment applied to an micromachine, wherein FIG. 4A is an outline view of this embodiment and FIG. 4B is a view showing an energy transducer therein; and FIGS. 5A to 5C are block diagrams explaining the outlines of a conventional energy supply method, wherein FIG. 5A shows a self-traveling type (energy source equipped and signal transmitting type), FIG. 5B shows a self-traveling type (energy source transmitting type), and 5C illustrates a stationary type.

DESCRIPTION OF THE PREFERRED EMBODIMENTS

Figure 1:
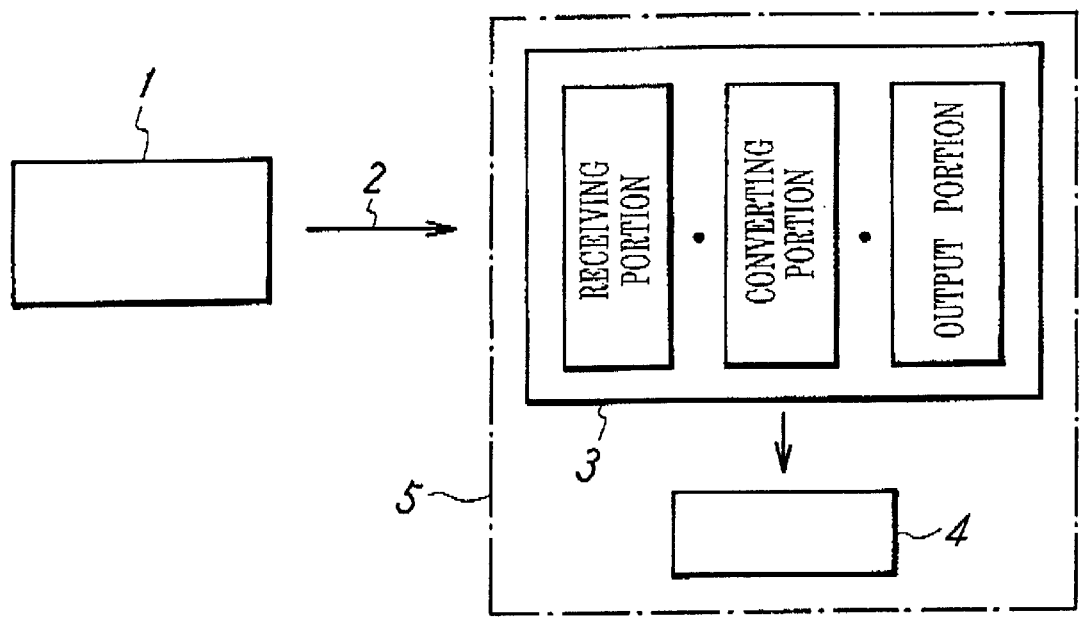
FIG. 1 is a conceptual block diagram explaining the outline of the present invention.

The energy supply method in accordance with the present invention is suited to an object to which energy is to be transmitted is relatively small, such as a micromachine. This method comprises converting the optical energy from an light source into high-voltage electrical energy by an energy transducer formed of either a piezoelectric element or a photovoltaic element on the above-described object; and supplying the above-described high-voltage electrical energy to an actuator. More specifically, in this method, (1) a thermal excitation light source such as the visible infrared region laser is used as a light source, and a piezoelectric element generating a thermal strain due to optical absorption is used as an energy transducer, or (2) a photovoltaic light source laser or an (ultraviolet irradiation) lamp is used as a light source, and a photovoltaic element generating a photovoltaic effect is used as an energy transducer.

The output generated in the above-described energy transducer is taken out as a high-voltage output, and this output is supplied to the actuator.

The piezoelectric element generating a thermal strain is an element formed of piezoelectric material such as lead zirconate titanate (PZT), lead lanthanum zirconate titanate (PLZT), barium titanate, or lead titanate. By irradiating the surface of the piezoelectric element with a directional light which can generate the wavelength of the infrared or visible region, thermal expansion is induced in the piezoelectric element. As a result, the piezoelectric element is subjected to expansions and contractions due to the periodic thermal expansion, thereby generating electric power. By laminating two sheets of piezoelectric elements so that the directions of the spontaneous polarization thereof become opposite to each other in order to form a bimorph structure, by vibrating the bimorph piezoelectric element from the both sides thereof, and by irradiating the bimorph piezoelectric element with light having a period such as to correspond to the natural frequency of the bimorph piezoelectric element, the bimorph structure comes into a resonant state. This enhances the effect of inducing high-voltage and that of raising the voltage.

The above-described photovoltaic element is an element formed of a photovoltaic functional material such as lead lanthanum zirconate titanate (PLZT), lithium niobate (LN), or lithium tantalate (LT). A lamp or a laser capable of generating the wavelength of the ultraviolet region is used as a light source, and after a photovoltaic force has been induced by the light irradiation, a high-voltage output is achieved. The use of this photovoltaic material allows the same output as that of the above-described piezoelectric elements to be achieved. It has been confirmed that the electric output obtained by this type of element amounts to several kilovolts. Therefore, it becomes possible to construct an efficient micromachine by connecting thereto an actuating mechanism suited to a high voltage and low current, such as an electrostatic actuator.

FIG. 1 is a conceptual block diagram showing a system for executing the energy supply method in accordance with the present invention. The light/heat 2 emitted from a light source control system 1 which controllably supplies optical-and-thermal energies, is inputted, without using a wire, to an energy transducer 3, which is constituted of a piezoelectric element or a photovoltaic element on an actuated device 5 to which energy is to be transmitted. Then, the high-voltage output which the energy transducer 3 outputs by a thermal strain effect or a photovoltaic effect is inputted to the actuator (actuating mechanism) 4, which actuates the actuated device 5. As the actuated device 5, a battery-unequipped self-traveling type micromachine is desirable. The piezoelectric element or the photovoltaic element constituting the minute energy transducer 3 can constitute a receiving portion, a converting portion, and an output portion using a single element.

Figure 2:
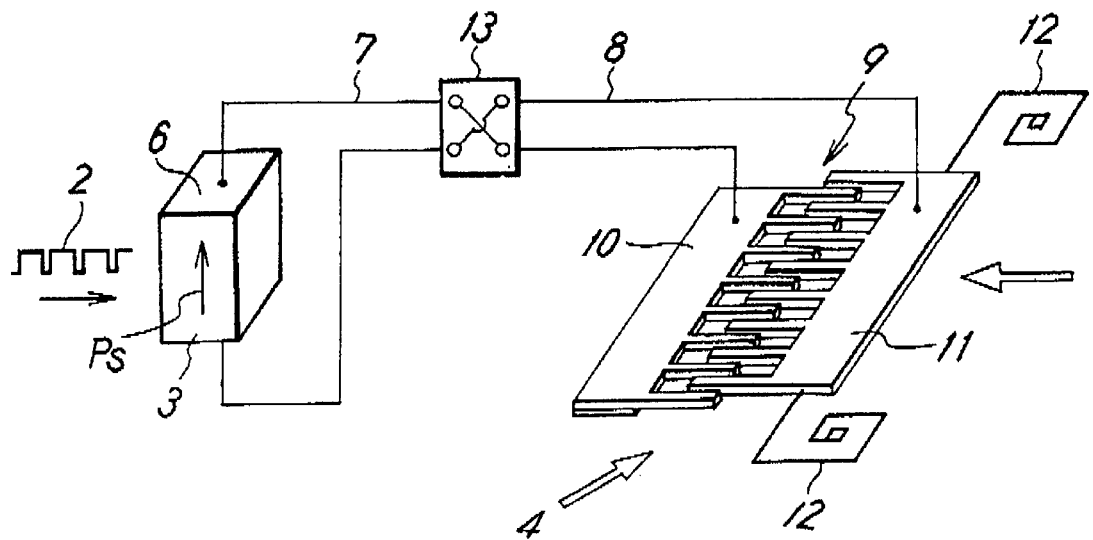
FIG. 2 is a diagram showing an embodiment of the present invention.

FIG. 2 is an embodiment wherein a comb-type electrostatic actuator 9 is used as an actuating mechanism 4 which is provided with a high-voltage output from the energy transducer 3.

The fixed portion 10 and the movable portion 11 of the electrostatic actuator 9 is each connected to the electrode 6 of the energy transducer 3 via conducting wires 7 and 8, and the movable portion 11 is supported on supporting portions 12 such as springs. Reference character Ps denotes the direction of spontaneous polarization and an induced electromotive force. Reference numeral 13 denotes a polarity switch for changing the polarity of an output voltage. This polarity switch 13 is adapted to be used only when a photovoltaic element is used as the energy transducer 3.

In this embodiment, once the surface of the transducer 3 has been irradiated with the light/heat 2, an electromotive force in the Ps direction is induced, and a high-voltage power is applied across the fixed portion 10 and the movable portion 11 of the electrostatic actuator 9. As a consequence, the movable portion 11 is actuated in the direction of, for example, the arrow indicated in the figure. The actuation duration of the movable portion 11 corresponds to the irradiation duration (number of pulses) of light, and the actuation direction is determined by the switching of the polarity switch 13. The teeth of the movable portion 11 of the electrostatic actuator 9 is arranged to move between teeth of the fixed portion without contacting teeth of the fixed portion.

Figure 3:
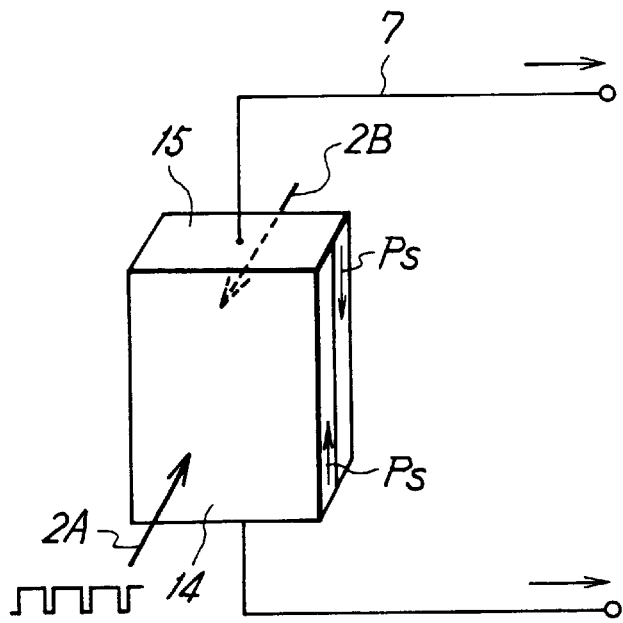
FIG. 3 is a diagram showing another embodiment of the present invention.
Figure 3:
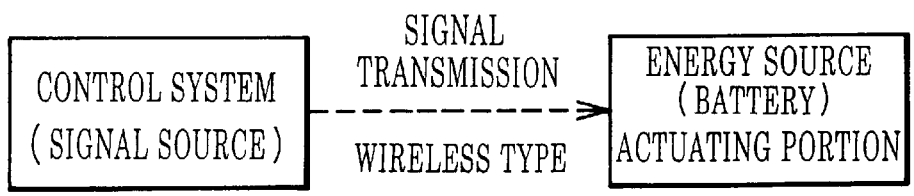
Figure 3:
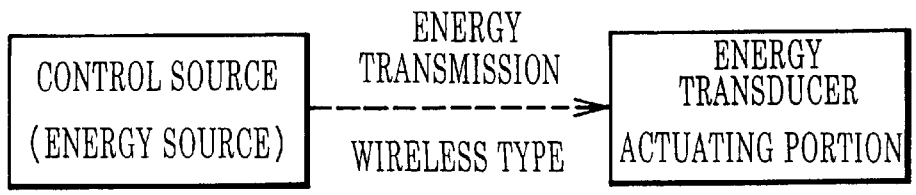
Figure 3:
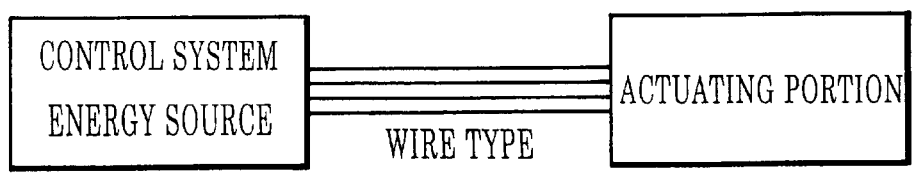

FIG. 3 shows another embodiment of the present invention, wherein a piezoelectric element 14 having a bimorph structure is used, and wherein both sides of the piezoelectric element 14 is irradiated with light 2A and 2B which have a period such as to correspond to the natural frequency of the piezoelectric element 14. The output voltage of the piezoelectric element 14 is outputted from a common electrode 15 via a conducting wire 7. In this method, the piezoelectric element 14 quickly comes into a resonant state. Making a phase difference between the lights 2A and 2B with which both sides of the piezoelectric element is irradiated, provides advantages in quickly creating a resonant state.

Figure 4A:
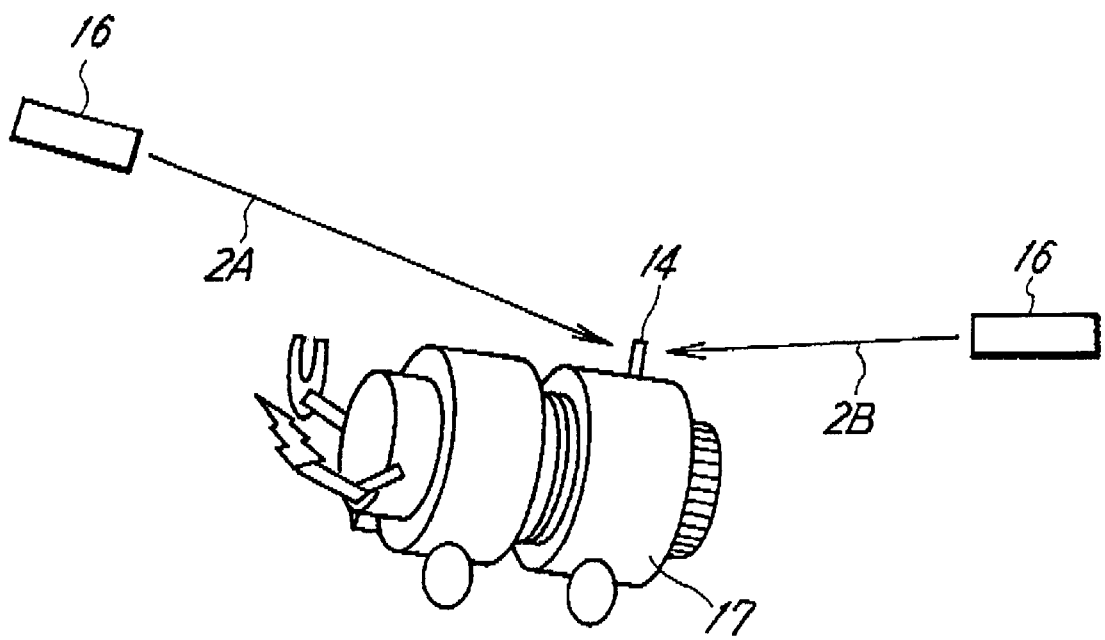
Figure 4B:
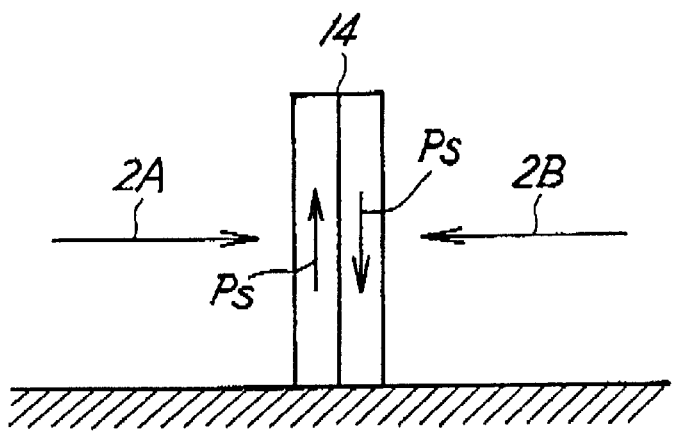

FIG. 4A is a schematic view showing an embodiment wherein the energy supply method in accordance with the present invention is applied to a micromachine, and FIG. 4B is a diagram explaining the energy transducer in the embodiment shown in FIG. 4A. Once the surface of a pair of conversion elements 17 in an energy transducer 14 with a bimorph structure on a micromachine 17 has been irradiated with the laser lights 2A and 2B from a pair of controllable light sources 16 such as lasers, the electromotive force in the Ps direction is induced in each of the pair of the conversion elements, and thereby a power is supplied to the actuating mechanism in the micromachine 17. The actuating mechanism for micromachine is operated by controlling the light supply by light sources 16 such as lasers.

What is claimed is:

1. A method for wireless power supply, which is applied to the case where an object to which energy is to be transmitted, is relatively small, said method comprising:

converting optical energy from a light source into a high-voltage electrical energy by a bimorph energy transducer formed of either a piezoelectric element generating thermal strain or a dielectric photovoltaic element on said object; and supplying said high-voltage electrical energy to an actuator.

2. A method for wireless power supply in accordance with claim 1, wherein a thermal excitation light source emitting visible infrared region laser light is used as the light source, and wherein a piezoelectric element generating a thermal strain due to optical absorption is used as the energy transducer.

3. A method for wireless power supply in accordance with claim 2, wherein a piezoelectric material comprised of lead zirconate titanate, lead lanthanum zirconate titanate, barium titanate, or lead titanate is used for the piezoelectric element generating a thermal strain.

4. A method for wireless power supply in accordance with claim 1, wherein a photovoltaic light source laser or an ultraviolet irradiation lamp is used as the light source, and wherein a photovoltaic element generating a photovoltaic effect is used as the energy transducer.

5. A method for wireless power supply in accordance with claim 4, wherein a photovoltaic functional material comprised of lead titanate zirconate lanthanate, lithium niobate, or lithium tantalate is used for said photovoltaic element.

6. A method for wireless power supply in accordance with any one of claims 1 through 5, wherein an electrostatic actuator is used as an actuator.

7. A method for wireless power supply in accordance with any one of claims 1 through 5, wherein said object to which energy is to be transmitted, is a micromachine.

* * * * *